TELEPHONE BURGLAR ALARM SYSTEM WITH SUCCESSIVE ALARM SIGNAL TRANSMISSION MEANS
Filed Feb. 9, 1962
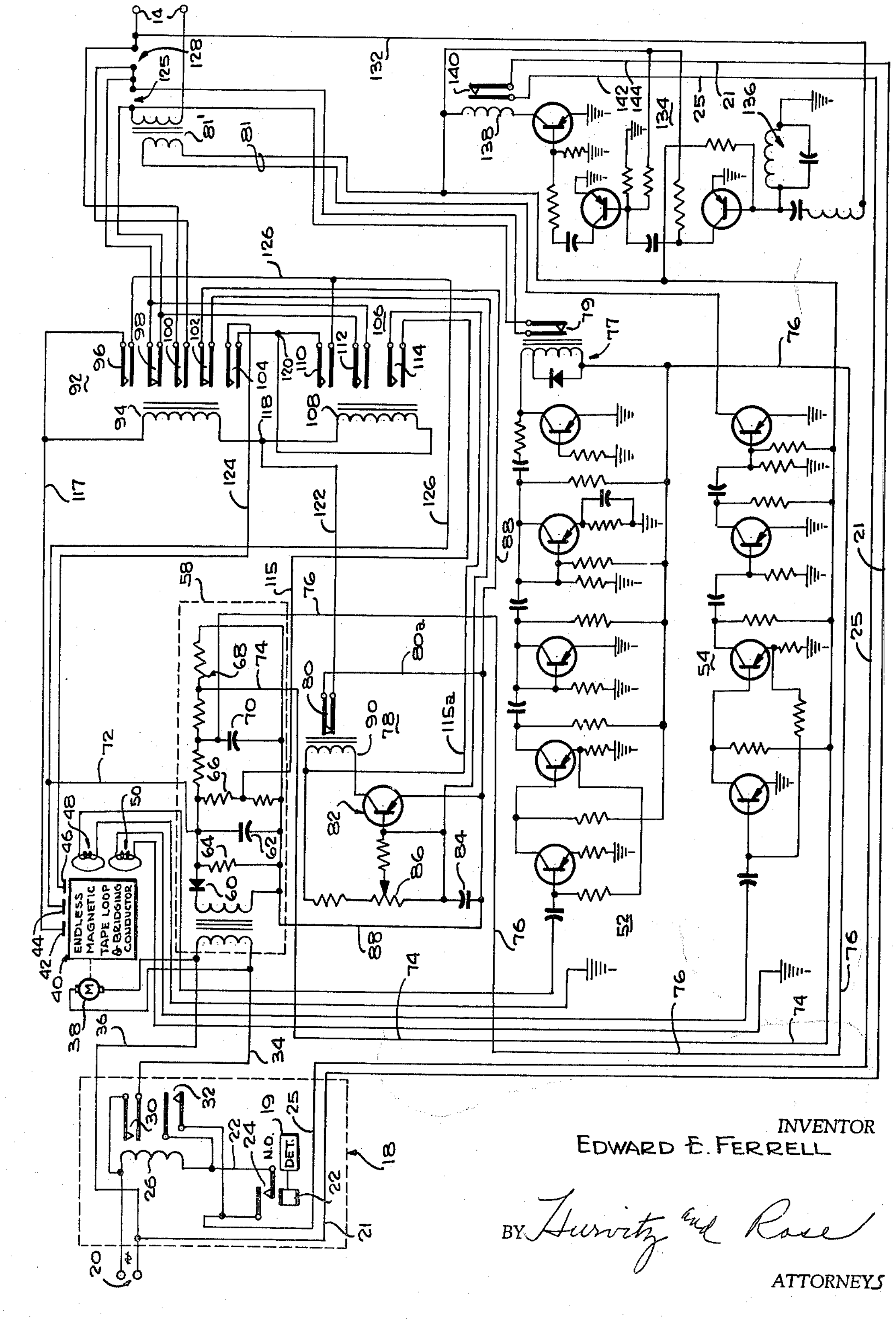
INVENTOR
EDWARD E. FERRELL
BY Hurvitz and Rose
ATTORNEYS 3,188,392

TELEPHONE BURGLAR ALARM SYSTEM WITH SUCCESSIVE ALARM SIGNAL TRANSMISSION MEANS

Edward E. Ferrell, 314 W. 6th St., Sanford, Fla.

Filed Feb. 9, 1962, Ser. No. 172,256
2 Claims. (Cl. 179—5)

This invention relates to burglar alarm systems and more particularly to burglar alarm systems of the type wherein a detection unit at a subscriber station detects an intruder and causes a signal to be transmitted through a telephone circuit to a sheriff's station automatically, the sheriff's station being so linked with the subscriber station that upon receipt of the signal by the sheriff's station, means at the sheriff's station resets the subscriber station for further operation.

According to one form of the invention, a photo-electric eye unit is provided at a subscriber station for detecting the presence of an intruder. The photo-electric eye unit causes a camera, upon detection of an intruder, to take pictures of the intruder and further causes a relay to be closed energizing a telephone ringing circuit at the subscriber station. An endless magnetic tape loop or equivalent means are provided at the subscriber station, the predetermined telephone number of a sheriff's station being recorded on that endless tape loop. The tape loop is energized in response to the photo-electric unit relay and causes the energization of a suitable relay circuit, which controls transmission of predetermined dialing pulses to a sheriff's station. When the sheriff's station responds to ringing pulses a conventional telephone system responsive to the dialing pulses, the dialing pulses originating at the subscriber station are cut off, and transmission is begun of a pre-recorded voice signal from the endless magnetic tape loop via a telephone line to the sheriff's station. At the termination of the pre-recorded voice transmission from the subscriber station, the sheriff's station is provided with means to reset through the telephone line the apparatus at the subscriber station. The length of time during which the voice signals are transmitted over the telephone line is sufficiently long, say three to five or six minutes, that when the operator at the sheriff's station lifts his receiver off the hook, the voice signals are in the process of being transmitted to the sheriff's station. Thus, there is no need to provide means associated with both the central station and the subscriber station for a de-activating or switching in an appropriate manner to energize a voice signal from the subscriber station since the voice signal is in process of transmission from the subscriber station to the sheriff's station. This expedient considerably simplifies burglar alarm systems according to the invention.

If the telephone receiver at the sheriff's station is for some reason not being attended, the burglar alarm system apparatus at the subscriber station will continue to alternately transmit dialing pulses and voice messages to the sheriff's station until the sheriff's station responds thereto. Once set, the only way that the burglar alarm system apparatus at the subscriber station may be terminated in its operation is by the transmission from the sheriff's station of a control tone signal to cut-off power to the burglar alarm system apparatus at the subscriber station.

The control signal which must be initiated at the sheriff's alarm station in order to de-energize the burglar alarm system apparatus at the subscriber station, provides additional security for the entire burglar alarm system, preventing spurious termination of burglar alarm signals. The conventional operation of the burglar alarm system apparatus at the subscriber station is further enhanced according to the invention by the provision thereat of an endless magnetic tape loop through which energizing current is supplied to the dialing pulse relay and the voice signal relay in continual succession until the sheriff's station responds in a certain manner to the message transmitted from the subscriber station. By utilizing transistors in the amplifiers for the dialing pulses and the voice signals at the subscriber station, no time is required to warm up the apparatus, thereby providing immediate response to the presence of an intruder at the subscriber station.

It is accordingly an object of the present invention to provide a burglar alarm system in which an alarm signal is transmitted to a central station in continual self-sequencing succession until the central station responds thereto.

It is another object of the present invention to provide a burglar alarm system in which intruder detecting and circuit energizing apparatus at a subscriber station is not de-energized until a proper response and action is taken at the central station.

Another object of the present invention is to provide in a burglar alarm system of the type wherein an alarm signal is sent from a subscriber station to a central station means for preventing the spurious response to an alarm signal.

Yet another object of the present invention is the provision of pre-recorded dialing signal pulses and voice signals on an endless magnetic tape loop at the subscriber station and in addition a conductive element on said magnetic tape loop for controlling the transmission of dialing pulses and voice signals from the subscriber station to a central station, a transmission of said signals being in a self-cycling sequence in continual succession until proper response is made at the central station.

Another object of this invention is the provision in a burglar alarm system of relay control means located at a subscriber station for controlling the timing of the transmission of dialing signal pulses to a central station to energize the telephone circuit thereat and the control of the timing of the transmission of voice alarm signals to said sheriff's station.

The above and still further objects, features and advantages of the present invention will become apparent upon consideration of the following detailed description of one specific embodiment thereof, especially when taken in conjunction with the accompanying drawing, wherein:

The single figure is a circuit diagram of a prefrerred embodiment of the invention.

Referring now more particularly to the single figure of the drawings, the subscriber station illustrated is assumed connected through a conventional telephone linkage system 14 with a central alarm station such as a sheriff's station, not shown. Block 18 represents a photo-electric detection unit or other suitable detection unit located in a subscriber station. A suitable source of 110–120 volts alternating current supply for the subscriber station 12 is indicated at 20. The numeral 21 indicates a supply line connected to the source 20.

The detection unit 18 at the subscriber station 12 may include a conventional photo-detector unit 19 which is suitably connected to a relay 22. A pair of normally open contacts 24 are close in response to energization of the relay 22. One of the contacts of the contact pair 24 is connected to a line 25. The other contact of the contact pair 24 is connected to one side of the source of power 20 through a relay operating winding 26. When light to the photo-electric unit 18 is interrupted, current is supplied to the relay operating winding 22 thereby closing the contact 24. When the contacts 24 are closed, current from the supply source 20 is supplied through the relay operating winding 26.

The stationary one of contacts 30 is connected to a supply line 34, and one terminal of the supply source 20 is connected to another supply line 36. When the contacts 30 are closed by the energization of the operating winding 26, current from the source 20 is supplied to the lines 34 and 36. The closing of the contacts 32 when the operating winding 26 is energized may serve to operate a camera or similar device (not shown) controlled by the contacts 32.

Shown at the top of the figure is a tape drive motor indicated by the numeral 38 connected across the supply lines 34, 36. The tape drive motor 38 is connected to suitable mechanical linkage of well-known design to drive an endless magnetic tape loop indicated as being in the block 40. Endless magnetic tape loop driving mechanisms and apparatus therefore are well-known in the art and are, therefore, not shown in detail. Recorded on the endless magnetic tape loop is a voice message indicating the presence of an intruder at the subscriber station 12; dialing pulses suitable to energize a pick-up head for the transmission thereof, and located on the tape in a section thereof is an electrically conducting strip. The numerals 42, 44 and 46 indicate three strip contacts located adjacent the magnetic tape loop 40 for electrical contact with the conducting strip mounted thereon. A dialing signal reproducing head 48 and a voice signal reproducing head 50 are located adjacent the magnetic tape loop 40 for reproducing therefrom the recorded dialing pulses and voice signals respectively.

The dialing pulse pick-up head 48 is connected to the input end of a dialing amplifier 52. The dialing amplifier 52 includes five cascaded stages of transistors. The voice pick-up head 50 is connected to the input stage of a four stage transistor cascaded amplifier 54.

The power supply for the substation 12 is generally indicated in the dotted line rectangle 58 and is transformer coupled to the power supply 20 through the lines 34 and 36. The power supply unit 58 includes a diode rectifier 60, a smoothing circuit including capacitor 62 and resistor 64, voltage dividers 66 and 68 and a filter capacitor 70.

A lead 72 is connected between the negative side of the power supply unit 58 and contact 44.

A lead 74 connected to the mid-point of the voltage divider 68 provides a negative supply voltage for the collectors of the PNP transistors of the voice amplifier 54, and a lead 76 connected to the negative side of the power supply unit 58 supplies a negative supply voltage for the PNP transistors of the dialing amplifier 52.

The dialing amplifier 52 amplifies pulses applied to the input thereof to operate a relay 77 having normally closed contacts 79. The contacts 79 are in series with telephone line 14. The output of the voice amplifier 54 is inductively coupled to the telephone line via the lines indicated at 81, and transformer 81'.

The numeral 78 indicates a relay timing circuit for controlling the opening and closing of a pair of contacts indicated at 80. The relay timing circuit 78 includes a PNP transistor 82 connected in a common emitter configuration. A capacitor 84 is connected at one terminal through a bias adjusting resistor 86 to the base electrode of the transistor 82 and the time necessary to charge the capacitor 84 controls the time when transistor 82 becomes conductive. The other side of the capacitor 84 is connected to the positive side of the power supply unit 58 through a comon return lead 88. Charging of the capacitor 84 for a predetermined period of time, say about 3 minutes, produces sufficient negative potential at the base electrode of the transistor 82 to cause conduction therein, thereby producing current flow through relay winding 90 in the collector circuit, and actuating contacts 80 to open condition.

The purpose of the contact strips 42, 44 and 46 in coaction with the conductive strip on the endless magnetic tape loop 40 and the timing relay circuit 78 is to control, through relays now to be described, the timing of the connection of the recorded information as amplified at the substation 12 into a conventional telephone system for communication with the sheriff's station.

A first relay 92 includes an operating coil 94 and five contact pairs 96, 98, 100, 102 and 104 respectively which are shown in the positions they occupy when the coil 94 is not energized. i.e. N.O., N.C., N.O., N.C., N.O. A second relay bank 106 includes an operating coil 108 and three contact pairs 110, 112 and 114 shown in their positions when the coil 108 is de-energized, i.e. N.O., N.O., N.O. The coil 94 is connected at one end via a lead 117 to the strip contact 42 and at the other end to a junction point indicated at 118. The stationary contact of the pair 104 is connected through a junction point 120 to the movable contact of pair 110. The coil 108 is connected at one end to the junction point 118 and at the other end to the junction point 120.

The junction point 118 is connected via a lead 122 to the stationary contact of the normally closed timing circuit relay 80, the movable contact of the relay 80 being connected via a lead 80 to the return lead 88. The movable contact of pair 102 is also connected via the return lead 88 to the return or grounded side of the power supply 58, the stationary contact of pair 102 being connected to the negative side of capacitor 84.

The movable contact of the pair 104 is connected via a lead 124 to the strip contact 46, and a lead 126 connects the strip contact 44 to the stationary contacts of the contact pairs 96 and 110. When closed, the contact pairs 98 and 100 bridge open circuits in one side of the telephone line 14, indicated at 125 and 128, respectively. The contact pair 102 when closed shunts the timing capacitor 84. The contacts 112 are connected in parallel with the contact pair 98. The stationary contact of pair 114 is connected to a point of the voltage divider 66 in the power supply unit 58 via a lead 115, and the movable contact of pair 114 is connected via a lead 115*a* to the negative potential side of the relay timing circuit 78.

A line 132 connects the telephone line 14 to a tuned amplifier 134 of the subscriber station. The tuned amplifier includes a parallel tuned circuit 136 and an amplifier having three common emitter transistor stages, the output of the last stage including an operating coil 138 which, when energized, opens a pair of normally closed contacts 140. The tuned amplifier 134 produces an output when a tone generating circuit (not shown) at the sheriff's station is energized, the result thereof being to reset the detection unit at the subscriber's station by cutting off the supply voltage thereto. The opening of the contacts 140 opens a circuit comprised of the lines 21 and 25 in series with the contacts 24 of the detection unit 18 and with the coil 26 of the supply voltage contacts 30, thereby de-energizing the detection unit 18 and resetting the burglar alarm system.

In operation, the supply source 20 is connected to the burglar alarm system of the subscriber station 12. The presence of an intruder is detected in a suitable well-known manner as by a photo-detector to energize the operating windings 22 and 26 thereby closing contacts 24, 30 and 32. The relay contacts 140 are normally closed so that until contacts 140 are opened by a tone signal transmitted from the sheriff's office, the burglar alarm system will be in continuous operation. The provision of the contacts 140 which may be opened only upon receipt of a tone signal from the sheriff's station through the amplifier 134 energizing the coil 136 prevents unauthorized de-energization of the detection apparatus at the subscriber station 12 prior to receipt of the alarm message therefrom.

When the detection apparatus detects an intruder, the lines 34 and 36 carry current from the supply source 20 to energize the tape drive motor 38 to drive the endless magnetic tape loop 40, and the conduction strip mounted on the tape 40 passes by the strip contacts 42, 44 and 46.

The conductive strip on the tape 40 electrically connects both of the contacts 42 and 46 to the contact 44. Supply voltage from the power supply 58 via the lead 72 is thereby impressed via the contact strip 44 and the conductive strip on the tape 40 on both contact strips 42 and 46. The contact strip 46 is connected to the open contact pair 104, an open circuit. However, the contact strip 42 conducts current from the power supply 58 through the lead 117 to the operating coil 94 of the relay 92, thereby closing contacts 96, 100 and 104 and opening contacts 98 and 102, the current being returned to the power supply 58 via the junction 118, lead 122, contact pair 80 and the lead 88. The holding contacts 96 are closed, and when the conductive strip on the tape 40 completely passes the contacts 42, 44 and 46, current from the power supply 58 is conducted via the lead 126 through the holding contacts 96 of the relay 92 to the junction 118, contacts 80, and return line 88.

When the coil 94 is energized, the relay contacts 98 are opened, and the contacts 100 are closed to thereby permit the intermittent interruption of the telephone line 14 by the contacts 79 of the dialing amplifier 52 to which dialing pulses are applied from the reproducing head 48. Thus dialing pulses recorded on the tape loop 40 are transmitted to a central station of a conventional telephone system, and through conventional telephone system linkage, ringing pulses reach the telephone receiver at the sheriff's station.

The normally closed contacts 102 shunt the timing capacitor 84. When the contacts 102 are opened by the energization of the coil 94, a charge may be built up on the timing capacitor 84, the base electrode of the transistor 82 being brought to an increasingly negative potential when a suitable potential is applied thereacross.

After a suitable period of dialing time (usually several seconds) which may be adjusted by variation of the length or speed of the endless tape loop 40 between the occurrence of engagement of the conductive strip thereon with the contact strips 42, 44 and 46, the conductive strip on the tape loop 40 again makes contact with the contact srips 42, 44 and 46. The contacts 104 have been closed due to the energization of the relay 92, and thus current flows from the power supply 58 via the lead 72 to the contact strip 44, via the conductive strip on the tape 40 to the contact strip 46 and via the lead 124, through the closed contacts 104, junction 120, and through the coil 108 thereby energizing said relay 106. Contacts 110, 112 and 114 are closed thereby. The contacts 110 serve as holding contacts for the relay 106 to maintain a supply of current via the lead 126 through the coil 108 to the contacts 110, junction 120, the coil 108, junction 118, lead 122, the contacts 80, lead **80*a* and to the return line 88**.

The closing of the contacts 112 bridges the telephone line 14 at the portion 81 thereof, thereby shunting the dialing pulse relay contacts 79, and voice currents from the voice amplifier 54 are transmitted to the sheriff's station via lines 81. It is to be understood that the telephone receiver at the sheriff's station may yet be ringing while said voice currents are being transmitted thereto, and if the receiver is lifted from the hook at the sheriff's station, the voice transmission thereto from the subscriber's station 12 may already be in progress. Obviously, the voice message may be of short duration and reiterated often so that the full information concerning the presence of the intruder, the subscriber station's location, etc., may be fully received.

The contacts 114, now closed, supply voltage from the power supply 58 via the leads 115 and **115*a* to charge the timing capacitor 84. The capacitance of the timing capacitor 84 may be of a suitable value to require a desired period of time to charge, say several seconds to several minutes (three minutes was found to be convenient). The duration of time necessary to charge the capacitor 84 determines the duration of time after the energization of the relay 106 for which the recorded voice message will be transmitted from the reproducing head 50 via amplifier 54 to the telephone line 14. When a sufficient negative potential is reached at the base electrode of the transistor 82, said transistor conducts to energize the operating coil of timing relay circuit 78, opening the contacts 80, thereby de-energizing both of the relays 92 and 106. When the relay 92 is thus de-energized, the contacts 102 again close to shunt the capacitor 84**, rapidly draining the charge thereon.

If, during the aforesaid period of time the sheriff's station has not responded to the call from the subscriber station 12, the conductive strip of the endless tape loop 40 will again engage the contact strips 42, 44 and 46 to initiate the energization of the relay 92 as previously described to begin anew the dialing of the sheriff's office and the subsequent sending of the voice message thereto until the sheriff's station responds.

After the sheriff's office responds to the message sent by the subscriber station 12, the burglar alarm apparatus at the subscriber's station may be reset by the transmission of a suitable tone signal from the sheriff's station over the telephone line 14 and line 132 to the tuned amplifier 134 at the subscriber's station. The tone signal from the sheriff's station is amplified and sufficient current is supplied to the operating coil 138 of the tuned amplifier relay to open the normally closed contacts 140, thereby breaking the circuit of lines 21 and 25 from the power source 20 to the relay coils 22 and 26 of the detection unit. The burglar alarm system is thus reset and will be energized when the detection unit 18 detects another intruder to operate the burglar system as previously described.

It is to be understood that the scope of this invention is not limited to the form illustrated and described herein, but is limited only by the appended claims.

What is claimed is:

1. In a telephone subscriber station having a telephone line connection to a central station, said central station having means responsive to dialing pulses from said subscriber station to connect said subscriber station to another station, signal detection means for deriving a signal in response to the occurrence of a predetermined event in the locale of said subscriber station, first message reproducing means actuable in response to said signal for transmitting recorded dialing pulses to the central station whereby said another station receives ringing pulses, second message reproducing means actuatable at a predetermined interval after actuation of said first message reproducing means for transmitting a recorded voice signal to said another station, means for recycling indefinitely the sequence of transmitting said dialing pulses and said voice signals in the event of no response at said another station to said ringing pulses, said recycling means including an endless tape loop having a conductive strip located thereon, contact means including first, second and third contacts located adjacent said endless tape loop for engagement with said conductive strip, said second contact being connected to a source of power, first relay means energizable when said conductive strip bridges said second and another of said contact means to connect said first message reproducing means to said telephone line, second relay means energizable to disconnect said first message reproducing means from the telephone line and to simultaneously connect said second message reproducing means to said telephone line, said recycling means further including a relay timing circuit the timing interval of which is initiated responsive to the energization of said second relay means, the relay of said relay timing circuit being energized to disconnect said first and second relay means at the end of said timing interval, whereby said sequence of energization of said first and said second relay means may be repeated responsive to engagement of said conductive strip with said contact means, and means at said subscriber station responsive to a tone signal received from said another station for de-energizing both message reproducing means at said subscriber station.

2. An alarm system for a telephone subscriber station comprising a source of power, reproducing means for transmitting pre-recorded dialing pulses and voice signals to a telephone line, detection means for connecting said reproducing means to said power source in response to the detection of a predetermined event in the locale of said subscriber station, switching means for connecting said reproducing means to the telephone line to transmit said dialing pulses and voice signals thereto in successive cycles indefinitely to supply ringing pulses and voice signals to another station, wherein said switching means includes a first contact connected to said source of power, a second contact and a third contact, and conductive means including a conductive strip mounted on an endless tape for bridging engagement with said first, second and third contacts substantially simultaneously, first, second and timing relay means, said first relay means being energized when said conductive strip engages said first, second and third contacts for a first time, holding contacts actuated when said first relay is energized to connect said first relay to said source of power, further contact means actuated for connecting said reproducing means to the telephone line for transmitting dialing pulses thereto, and contact means actuated for connecting said second relay means to a point of said power source whereby when said conductive strip engages said contacts a second time, said second relay means is energized, contact means actuated when said second relay is energized to connect said reproducing means to said telephone line for transmission of voice signals thereto and to initiate a cycle of energization of said timing relay, and contact means actuated when said timing relay is energized at the completion of a cycle thereof for de-energizing said first and second relays, whereby said first and second relays are reset to be further energized responsive to a subsequent engagement of said conductive strip with said first, second and third contacts, and means in said subscriber station actuatable to disconnect said reproducing means from said power source responsive to a tone signal from the sheriff's station.

References Cited by the Examiner

UNITED STATES PATENTS

| | | | |
|---|---|---|---|
| 2,332,776 | 10/43 | Bell | 179—5.1 |
| 2,399,229 | 4/46 | Jacobson | 179—5.1 |
| 2,827,515 | 3/58 | Zuber | 179—5.1 |
| 2,847,507 | 8/58 | Stradley | 179—5.1 |
| 2,937,237 | 5/60 | Zanardo | 179—100.2 |

DAVID G. REDINBAUGH, *Primary Examiner.*